United States Patent
Qin

(10) Patent No.: US 8,830,400 B2
(45) Date of Patent: Sep. 9, 2014

(54) METHOD, APPARATUS, AND SYSTEM FOR IMPLEMENTING PICTURE IN PICTURE IN HOME NETWORK

(75) Inventor: Xiaoqing Qin, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 117 days.

(21) Appl. No.: 13/594,484

(22) Filed: Aug. 24, 2012

(65) Prior Publication Data

US 2013/0222695 A1 Aug. 29, 2013

(30) Foreign Application Priority Data

Sep. 26, 2011 (CN) .......................... 2011 1 0289045

(51) Int. Cl.
*H04N 5/45* (2011.01)
*H04N 5/265* (2006.01)
*H04N 21/431* (2011.01)
*H04N 21/2343* (2011.01)
*H04N 21/436* (2011.01)

(52) U.S. Cl.
CPC ............ *H04N 5/45* (2013.01); *H04N 21/4316* (2013.01); *H04N 21/234363* (2013.01); *H04N 21/43615* (2013.01)
USPC ........... 348/565; 348/564; 348/588; 348/584; 348/556

(58) Field of Classification Search
CPC ..... H04N 5/45; H04N 5/44591; H04N 5/265; H04N 21/4316; H04N 21/4314; H04N 21/43615
USPC ......... 348/565, 563, 564, 584, 588, 731, 555, 348/556
See application file for complete search history.

(56) References Cited

U.S. PATENT DOCUMENTS 7,532,253 B1    5/2009  Greenberg
7,830,459 B2 *  11/2010 Nadarajah ................. 348/732

(Continued)

FOREIGN PATENT DOCUMENTS

CN    1700751 A     11/2005
CN    1976439 A      6/2007
CN    101056277 A   10/2007
CN    101820527 A    9/2010

OTHER PUBLICATIONS

Written Opinion of the International Searching Authority issued in corresponding PCT Patent Application No. PCT/CN2010/080394, mailed Apr. 21, 2011.

(Continued)

*Primary Examiner* — Jefferey Harold
*Assistant Examiner* — Jean W Desir
(74) *Attorney, Agent, or Firm* — Brinks Gilson & Lione

(57) ABSTRACT

Embodiments of the present invention provide a method, an apparatus, and a system for implementing picture in picture in a home network. The method for implementing picture in picture in a home network includes: obtaining a video stream of a video main window from a video network and decoding and playing the video stream of the main window; receiving a picture in picture activation signal sent by a user; sending a transcoding request message to a control device, where the transcoding request message carries a number of a picture in picture video sub-window channel; receiving a video stream of the video sub-window channel, where the video stream has been transcoded and then sent by the control device; and decoding and playing the video stream of the video sub-window channel.

20 Claims, 8 Drawing Sheets

(56) References Cited

U.S. PATENT DOCUMENTS

| | | |
|---|---|---|
| 2004/0168185 A1 | 8/2004 | Dawson et al. |
| 2005/0015805 A1 | 1/2005 | Iwamura |
| 2005/0044570 A1 | 2/2005 | Poslinski |
| 2007/0237090 A1 | 10/2007 | Kim et al. |
| 2008/0313670 A1 | 12/2008 | Ho et al. |
| 2010/0220769 A1 | 9/2010 | Sato |

OTHER PUBLICATIONS

Office Action with Search Report issued in corresponding Chinese Patent Application No. 201010103230.2, mailed Jul. 10, 2012.
Extended European Search Report issued in corresponding European Patent Application No. 12182549.1, mailed Feb. 28, 2013.
International Search Report issued in corresponding PCT Patent Application No. PCT/CN2012/081792, mailed Nov. 29, 2012.

* cited by examiner

101. Obtain a video stream of a video main window from a video network and decode and play the video stream of the main window 102. Receive a picture in picture activation signal sent by the user 103. Send a transcoding request message to the control device, where the transcoding request message carries a channel number of a picture in picture video sub-window 104. Receive the video stream of the channel of the video sub-window transcoded and sent by the control device 105. Decode and play the video stream of the channel of the video sub-window

FIG. 1

METHOD, APPARATUS, AND SYSTEM FOR IMPLEMENTING PICTURE IN PICTURE IN HOME NETWORK

CROSS-REFERENCE TO RELATED APPLICATION

This application claims priority to Chinese Patent Application No. 201110289045.1, filed on Sep. 26, 2011, which is hereby incorporated by reference in its entirety.

FIELD OF THE INVENTION

The present invention relates to the field of cable television technologies, and in particular, to a method, an apparatus, and a system for implementing picture in picture in a home network.

BACKGROUND OF THE INVENTION

Picture in picture is using a digital technology to display two sets of programs on one screen, that is, in a normally viewed main window, one or more compressed sub-windows are inserted, so that other channels can be viewed at the same time of watching the main window.

A home network is a combination of two or multiple devices at one home or in one area, including a computer, a printer, or other devices interconnected to implement mutual communication and resource sharing. The home network can allow members at the home or in the area to share a file, Internet access, CD-ROM (Compact Disc Read-Only Memory, compact disc read-only memory), hard disk, and more other resources.

In the prior art, to implement a picture in picture function, at least two tuners (Tuners) may be configured in a video device, for example, a digital STB (Set-Top Box, set-top box). The at least two tuners may be tuned to different frequencies according to tuning operations of a user to separately receive television signals of different channels, thereby implementing the picture in picture function. However, a home network usually includes a plurality of video devices. Therefore, to implement the picture in picture function of the video devices in the home network, two or more tuners need to be configured in every video device supporting the picture in picture function in the home network, and the cost is very high.

SUMMARY OF THE INVENTION

The embodiments of the present invention adopt the following technical solutions:

A method for implementing picture in picture in a home network includes:

obtaining a video stream of a video main window from a video network and decoding and playing the video stream of the main window;

receiving a picture in picture activation signal sent by a user;

sending a transcoding request message to a control device, where the transcoding request message carries a number of a picture in picture video sub-window channel;

receiving a video stream of the video sub-window channel, where the video stream has been transcoded and then sent by the control device; and decoding and playing the video stream of the video sub-window channel.

A method for implementing picture in picture in a home network includes:

receiving a transcoding request message sent by a video device, where the transcoding request message carries a number of a picture in picture video sub-window channel;

obtaining a video stream of the video sub-window channel from a video network, and transcoding the video stream; and sending a transcoded video stream of the video sub-window channel to the video device.

A video device includes:

a main window playing unit, configured to obtain a video stream of a video main window from a video network and decode and play the video stream of the main window;

a receiving unit, configured to receive a picture in picture activation signal sent by a user;

a sending unit, configured to send a transcoding request message to a control device, where the transcoding request message carries a number of a picture in picture video sub-window channel;

where the receiving unit is further configured to receive a video stream of the video sub-window channel, where the video stream has been transcoded and then sent by the control device; and a sub-window playing unit, configured to decode and play the video stream of the video sub-window channel, where the video stream is received by the receiving unit.

A control device includes:

a receiving unit, configured to receive a transcoding request message sent by a video device, where the transcoding request message carries a number of a picture in picture video sub-window channel;

at least one tuner, configured to obtain a video stream from a video network;

a transcoding unit, configured to transcode a video stream of the video sub-window channel, where the video stream is obtained by the tuner from the video network; and a sending unit, configured to send a transcoded video stream of the video sub-window channel to the video device.

A video system in a home network includes:

a control device and at least two video devices, where, the control device includes at least one tuner and supports video transcoding, and a video device supports video decoding on at least two channels;

the video device is configured to:

independently obtain a video stream of a picture in picture main window from a video network, and decode and play the video stream of the main window;

receive a picture in picture activation signal sent by a user;

send a transcoding request message to the control device, where the transcoding request message carries a number of a picture in picture video sub-window channel;

receive a video stream of the video sub-window channel, where the video stream has been transcoded and then sent by the control device; and decode and play the received video stream of the video sub-window channel;

the control device is configured to:

receive the transcoding request message sent by the video device, where the transcoding request message carries the number of the picture in picture video sub-window channel;

by using the tuner, obtain a video stream of the video sub-window channel from the video network, and transcode the video stream; and send a transcoded video stream of the video sub-window channel to the video device.

BRIEF DESCRIPTION OF THE DRAWINGS

FIG. 1 is a flowchart of a method for implementing picture in picture in a home network according to an embodiment of the present invention;

DETAILED DESCRIPTION OF THE EMBODIMENTS

Figure 2:
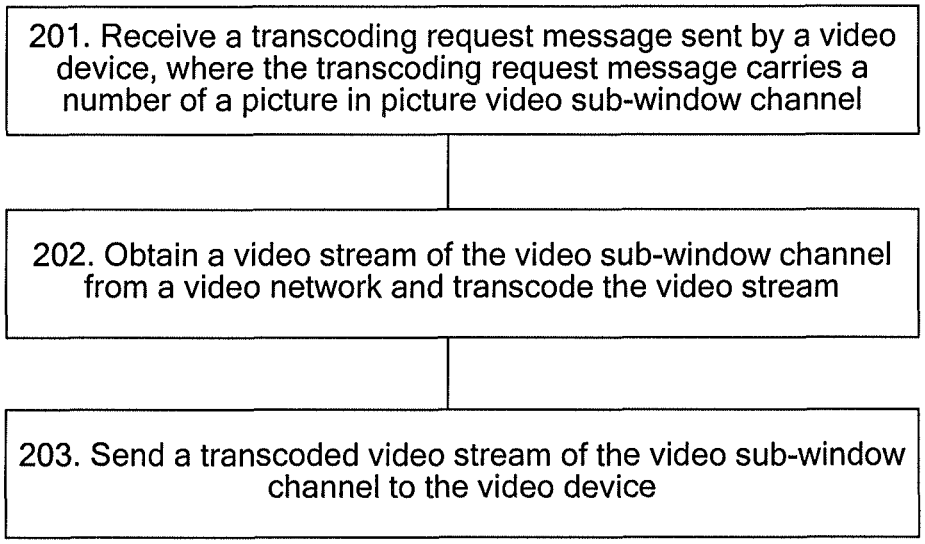
FIG. 2 is a flowchart of a method for implementing picture in picture in a home network according to an embodiment of the present invention.

Technical solutions of embodiments of the present invention are hereinafter described clearly and completely with reference to accompanying drawings in the embodiments of the present invention.

It should be clarified that, the described embodiments are only part rather than all of the embodiments of the present invention. All other embodiments obtained by persons of ordinary skill in the art based on the embodiments of the present invention without creative efforts shall fall within the protection scope of the present invention.

To enable persons skilled in the art better understand the technical solutions of the present invention, an application scenario, a hardware requirement and so on of a method for implementing picture in picture in a home network provided by the embodiments of the present invention are briefly illustrated first, serve as specific examples here, and do not impose any limitation on the present invention.

In the method for implementing picture in picture in the home network provided by the embodiments of the present invention, the home network includes a control device and at least two video devices. The implementing picture in picture means inserting a video sub-window into a normally viewed video main window, that is, the video main window and the video sub-window are displayed on a same display device simultaneously. The video sub-window may be embedded into the video main window, that is, the video sub-window is located in the video main window. The video sub-window may also be displayed in parallel with the video main window. That is, the video sub-window is located outside the video main window. After picture in picture is implemented, the user can also view the video sub-window while watching the main window.

The control device needs to include at least one tuner and support video transcoding, and a video device supports video decoding on at least two channels. Video transcoding means transcoding a video stream into a video stream matching a decoding capability of the video device, that is, into a video stream that can be decoded by the video device, for example, transcoding a high definition stream into a standard definition stream that the video device can decode, where high definition and standard definition are defined in the prior art, and are not described in detail herein. Specifically, for example, a video stream with a resolution of 1920×1080 or a resolution of 1280×720 is transcoded into a video stream with a resolution of 640×480, or an H.264 video stream is transcoded into an MPEG2 video stream.

The video device supports video decoding on at least two channels. Decoding on one channel is used for playing of the video main window, while decoding on another channel is used for playing of the video sub-window.

It should be noted that the control device itself may also have all functions of the video device.

The technical solutions in the embodiments of the present invention are described below in detail.

A method for implementing picture in picture in a home network provided by an embodiment of the present invention, as shown in FIG. 1, is based on the foregoing video device, and includes:

101. Obtain a video stream of a video main window from a video network and decode and play the video stream of the main window.

Optionally, the video network includes a Cable network (cable television network) or an IP (Internet Protocol) network (Internet Protocol network).

Before a user selects a picture in picture function, a video outputting apparatus of the video device, for example, a screen, displays only the video main window, and the video main window is a video program of a channel currently selected by the user. The video device independently obtains the video stream of the video main window from the video network and decodes and plays the video stream.

102. Receive a picture in picture activation signal sent by the user.

The user selects the picture in picture function, and sends the picture in picture activation signal to the video device. Optionally, the picture in picture activation signal carries a number of a video sub-window channel selected by the user.

103. Send a transcoding request message to a control device, where the transcoding request message carries a number of a picture in picture video sub-window channel.

After receiving the picture in picture activation signal of the user, the video device sends the transcoding request message to the control device. Optionally, if the picture in picture activation signal sent by the user carries the number of the video sub-window channel selected by the user, the number of the video sub-window channel in the transcoding request message is the number of the video sub-window channel selected by the user; or, if the picture in picture activation signal sent by the user does not carry the number of the video sub-window channel selected by the user, the number of the video sub-window channel in the transcoding request message is a default number of a video sub-window channel, for example, a number of a video sub-window channel which is preset in the video device and is displayed when picture in picture is activated for the first time, or a number of a video sub-window channel which is displayed last during previous execution of the picture in picture function.

Preferably, the transcoding request message may further carry decoding capability information of the video device itself, where the information is used to indicate a type of a stream that the video device can currently decode; after receiving the transcoding request, the control device can determine, according to the decoding capability information, a transcoding manner of a video stream of a video sub-window channel, for example, the decoding capability information indicates that the video device can currently decode a video stream with a resolution of 640×480, and according to the decoding capability information, the control device determines to transcode the video stream of the video sub-window channel into a video stream with a resolution of 640×480.

104. Receive a video stream of the video sub-window channel, where the video stream has been transcoded and then sent by the control device.

After receiving the transcoding request message, the control device uses a tuner configured in the control device, to obtain a video stream of the video sub-window channel from the video network, for example, the Cable network or the IP network, and transcode the video stream into a stream that the video device can decode. For example, the video stream obtained from the video network is a high definition stream; the control device transcodes the high definition stream into a standard definition stream that the video device can decode, and then the control device sends the transcoded video stream to the video device.

105. Decode and play the video stream of the video sub-window channel.

It should be noted that in a process of performing steps 102 to 105, the video device keeps decoding and playing the video stream of the main window, that is, the video main window keeps playing and displaying.

After receiving the video stream transcoded by the control device, the video device performs decoding and playing, that is, implements playing of a video sub-window, thereby implementing the picture in picture function.

In the method for implementing picture in picture in the home network provided by the embodiment of the present invention, when implementing the picture in picture function, the video device independently obtains the video stream of the video main window from the video network and decodes and plays the video stream of the video main window, while with respect to the video sub-window, the video device depends on the control device to obtain the video stream of the video sub-window from the video network and perform transcoding, and then the video device decodes and plays the video stream transcoded by the control device. Therefore, it is not required that each video device supporting the picture in picture function in the home network is configured with two or more tuners for separately obtaining the video stream of the main window and the video stream of the sub-window from the video network, and therefore, the cost is saved effectively.

In the embodiment of the present invention, because the home network includes multiple video devices, transcoding performed by the control device for each video device occupies a tuner and certain transcoding resources of the control device, and the control device has a limited number of tuners and a limited transcoding capability, and may be incapable of performing transcoding of the video sub-window for a large number of video devices simultaneously. To enable each video device in the home network to know the quantity of idle tuners and the transcoding capability of the control device, in the method for implementing picture in picture in the home network according to the embodiment of the present invention, the control device may broadcast idle-tuner information and transcoding capability information to each video device in the home network.

The idle-tuner information indicates the quantity of current idle tuners of the control device, that is, the quantity of tuners that can be used; the transcoding capability information indicates the transcoding capability of the control device, and may include a parameter such as a coding scheme of a transcoded stream and/or resolution of a transcoded stream. According to the idle-tuner information of the control device, each video device can determine whether the control device has an idle tuner, while according to the transcoding capability information of the control device, each video device can determine whether a coding scheme of a stream transcoded by the control device and/or resolution a stream transcoded by the control device matches a decoding capability of the video device itself, that is, determining whether the control device is capable of video transcoding. The idle-tuner information and transcoding capability information may be sent periodically, that is, sent once at intervals. Optionally, when a change of the quantity of idle tuners or an event of a transcoding capability change occurs, the control device may also be triggered to broadcast refreshed idle-tuner information and transcoding capability information to each video device in the home network.

In this case, the method for implementing picture in picture in the home network in this embodiment further includes:

receiving the idle-tuner information of the control device which is broadcast by the control device;

receiving the transcoding capability information of the control device which is broadcast by the control device; and according to the received idle-tuner information and transcoding capability information of the control device, determining whether the control device has an idle tuner and is capable of video transcoding.

It can be understood that after step 102 and before step 103, the video device may determine, according to last received idle-tuner information and transcoding capability information of the control device, whether the control device has an idle tuner and is capable of video transcoding; in this case, step 103 is specifically:

if it is determined that the control device has an idle tuner and is capable of video transcoding, sending the transcoding request message to the control device.

Specifically, the video device may determine, according to the idle-tuner information, whether the control device still has an idle tuner, and determine, according to the transcoding capability information, whether the control device is capable of video transcoding. For example, according to the transcoding capability information of the control device, the video device can determine whether a stream transcoded by the control device and/or a resolution of a stream transcoded by the control device matches the decoding capability of the video device itself, that is, determine whether the control device is capable of video transcoding.

Further, if the user wants to switch the channel of the video sub-window after step 105, the method for implementing picture in picture in the home network in the embodiment of the present invention includes:

receiving a signal which is sent by the user and is for switching the video sub-window channel;

sending a transcoded channel change request message to the control device, where the channel change request message includes a number of a video sub-window channel to which the user switches;

receiving a video stream of the video sub-window channel to which the user switches, where the video stream has been transcoded by the control device and is sent by the control device; and decoding and playing the received video stream of the video sub-window channel to which the user switches.

The control device receives the transcoded channel change request message, obtains, from the video network, the video stream of the video sub-window channel to which the user switches, transcodes the video stream, and sends a transcoded video stream to the video device; and the video device performs decoding and playing, thereby implementing switching of the video sub-window channel.

Further, if the user wants to exit the picture in picture function after step 105, the method for implementing picture in picture in the home network in the embodiment of the present invention includes:

receiving a picture in picture exit signal sent by the user; and sending a request for stopping transcoding to the control device.

After receiving the request for stopping transcoding sent by the video device, and according to the request for stopping transcoding, the control device stops transcoding the video stream of the video sub-window channel, where the video stream is obtained from the video network, thereby exiting the picture in picture function.

Optionally, in an embodiment of the present invention, after step 102 and before step 103, the method may further include the following steps:

sending an use application message for an idle tuner to the control device; and receiving a response message of the control device for the use application, where the response message includes an identity of a tuner which is allocated by the control device from idle tuners to the video sub-window for use.

After receiving the use application message for a tuner, the control device selects one from its idle tuners, and determines the one to be the tuner allocated for use for this use application, and includes the identity (ID) of the selected tuner into the response message for this use application, to notify the video device of the tuner used for the video device.

In this case, step 103 is specifically:

sending a transcoding request message to the control device, where the transcoding request message carries the number of the picture in picture video sub-window channel and the identity of the tuner allocated by the control device to the video sub-window for use.

After receiving the transcoding request, the control device obtains, by using the tuner corresponding to the identity, the video stream of the video sub-window channel from the video network, and transcodes the video stream.

Further, if the user wants to switch the channel of the video sub-window, the method for implementing picture in picture in the home network in the embodiment further includes:

receiving a signal which is sent by the user and is for switching the video sub-window channel;

sending a transcoded channel change request message to the control device, where the channel change request message includes a number of a video sub-window channel to which the user switches, and the identity of the tuner allocated by the control device to the video sub-window for use;

receiving a video stream of the video sub-window channel to which the user switches, where the video stream is obtained from the video network and through the tuner corresponding to the identity, and has been transcoded by the control device, and is sent by the control device; and decoding and playing the received video stream of the video sub-window channel to which the user switches.

Further, if the user wants to exit the picture in picture function, the method for implementing picture in picture in the home network in the embodiment further includes:

receiving a picture in picture exit signal sent by the user;

sending a request for stopping transcoding to the control device, where the request for stopping transcoding includes the identity of the tuner allocated by the control device to the video sub-window for use, so that the control device stops transcoding a video stream obtained from the video network and through the tuner corresponding to the identity, and refreshes the transcoding capability information of the control device; and sending a tuner releasing request to the control device, where the tuner releasing request includes the identity of the tuner allocated by the control device to the video sub-window for use, so that the control device stops using the tuner corresponding to the identity, and refreshes the idle-tuner information of the control device.

Corresponding to the method shown in FIG. 1, an embodiment of the present invention also provides a method for implementing picture in picture in a home network, which is based on a control device, and as shown in FIG. 2, includes:

201. Receive a transcoding request message sent by a video device, where the transcoding request message carries a number of a picture in picture video sub-window channel.

202. Obtain a video stream of the video sub-window channel from a video network and transcode the video stream.

Specifically, after receiving the transcoding request message, the control device uses a tuner configured in the control device, to obtain the video stream of the video sub-window channel from the video network, for example, a Cable network or an IP network, and transcode the video stream. For example, the video stream obtained from the video network is a high definition stream; the control device transcodes the high definition stream into a standard definition stream, and then the control device sends the transcoded video stream to the video device.

203. Send a transcoded video stream of the video sub-window channel to the video device.

In the method for implementing picture in picture in the home network provided by the embodiment of the present invention, when implementing a picture in picture function, the video device independently obtains the video stream of the video main window from the video network and decodes and plays the video stream of the video main window, while with respect to a video sub-window, the video device depends on the control device to obtain a video stream of the video sub-window from the video network and perform transcoding, and then the video device decodes and plays the video stream transcoded by the control device. Therefore, it is not required that each video device supporting the picture in picture function in the home network is configured with two or more tuners for separately obtaining the video stream of the main window and the video stream of the sub-window from the video network, and therefore, the cost is saved effectively.

Preferably, the transcoding request message received in step 201 may further carry decoding capability information of the video device itself.

In this case, the method for implementing picture in picture in the home network provided by the embodiment of the present invention further includes:

according to the decoding capability information, determining a transcoding manner of the video stream of the video sub-window channel.

The transcoding the video stream in step 202 is specifically:

transcoding the video stream in the determined transcoding manner.

In the embodiment of the present invention, because the home network includes multiple video devices, transcoding performed by the control device for each video device occupies an tuner and certain transcoding resources of the control device, and the control device has a limited number of tuners and a limited transcoding capability, and may be incapable of performing transcoding of the video sub-window for a large number of video devices simultaneously. To enable each video device in the home network to know the quantity of idle tuners and the transcoding capability of the control device, the method for implementing picture in picture in the home network according to the embodiment further includes:

broadcasting idle-tuner information to the video device in the home network; and broadcasting transcoding capability information to the video device in the home network.

The idle-tuner information indicates the quantity of current idle tuners of the control device; the transcoding capability information indicates the transcoding capability of the control device, and may include parameters such as a coding scheme of a transcoded stream and/or a resolution of a transcoded stream. According to the idle-tuner information of the control device, each video device can determine whether the control device has an idle tuner, while according to the transcoding capability information of the control device, each video device can determine whether a stream transcoded by the control device and/or a resolution of a stream transcoded by the control device matches a decoding capability of the video device itself, that is, determine whether the control device is capable of video transcoding. The idle-tuner information and transcoding capability information may be sent periodically, that is, sent once at intervals. Optionally, when a change of the quantity of idle tuners or an event of a transcoding capability change occurs, the control device may also be triggered to broadcast refreshed idle-tuner information and transcoding capability information to each video device in the home network.

Further, if a user wants to switch the channel of the video sub-window after step 203, the method for implementing picture in picture in the home network in the embodiment of the present invention further includes:

receiving a transcoded channel change request message sent by the video device, where the transcoded channel change request message includes a number of a video sub-window channel to which the user switches;

obtaining, from the video network, a video stream of the video sub-window channel to which the user switches, and transcoding the video stream; and sending, to the video device, a transcoded video stream of the video sub-window channel to which the user switches.

Further, if the user wants to exit the picture in picture function after step 203, the method for implementing picture in picture in the home network in the embodiment of the present invention further includes:

receiving a request for stopping transcoding sent by the video device; and according to the request for stopping transcoding, stopping transcoding the video stream of the video sub-window channel, where the video stream is obtained from the video network.

Further, in an embodiment of the present invention, before step 201, the method may include:

receiving a use application message for an idle tuner sent by the video device;

among idle tuners, determining a tuner allocated to the video sub-window for use; and sending a response message for the use application to the video device, where the response message includes an identity of the determined tuner allocated to the video sub-window for use.

After receiving the use application message for an idle tuner, the control device selects one from its idle tuners, and determines the one to be the tuner allocated for use for the current use application, and includes the identity (ID) of the selected tuner into the response message for this use application, to notify the video device of the tuner used for the video device. For example, tuners 1, 2, and 4 are idle, and the control device selects tuner 2 as a tuner allocated for use with respect to this use application. The embodiment of the present invention does not limit how the control device determines, among idle tuners, a tuner allocated to the video sub-window for use, and the tuner may be determined randomly or according to idle time of each tuner and other selecting rules.

In this case, step 201 is specifically:

receiving a transcoding request message sent by the video device, where the transcoding request message carries the number of the picture in picture video sub-window channel and the identity of the determined tuner allocated to the video sub-window for use; and step 202 is specifically:

by using the tuner corresponding to the identity, obtaining the video stream of the video sub-window channel from the video network, and transcoding the video stream.

Further, if the user wants to switch the channel of the video sub-window, the method for implementing picture in picture in the home network in the embodiment further includes:

receiving a transcoded channel change request message sent by the video device, where the channel change request message includes a number of a video sub-window channel to which the user switches, and the identity of the tuner allocated by the control device to the video sub-window for use;

through the tuner corresponding to the identity, obtaining, from the video network, a video stream of the video sub-window channel to which the user switches, and transcoding the video stream; and sending, to the video device, a transcoded video stream of the video sub-window channel to which the user switches.

Further, if the user wants to exit the picture in picture function, the method for implementing picture in picture in the home network in the embodiment further includes:

receiving a request for stopping transcoding sent by the video device, where the request for stopping transcoding includes the identity of the tuner allocated by the control device to the video sub-window for use;

according to the request for stopping transcoding, stopping transcoding the video stream obtained from the video network and through the tuner corresponding to the identity, and refreshing the transcoding capability information;

receiving a tuner releasing request sent by the video device, where the tuner releasing request includes the identity of the tuner allocated by the control device to the video sub-window for use; and according to the tuner releasing request, stopping using the tuner corresponding to the identity, and refreshing the idle-tuner information.

It should be noted that the foregoing request for stopping transcoding and the foregoing tuner releasing request may be received simultaneously, or received in sequence; the processing according to the request for stopping transcoding and the processing according to the tuner releasing request may also be performed simultaneously, or performed in sequence; that is, the sequence of the foregoing four substeps is not limited and may be changed by those skilled in the art.

Figure 3:
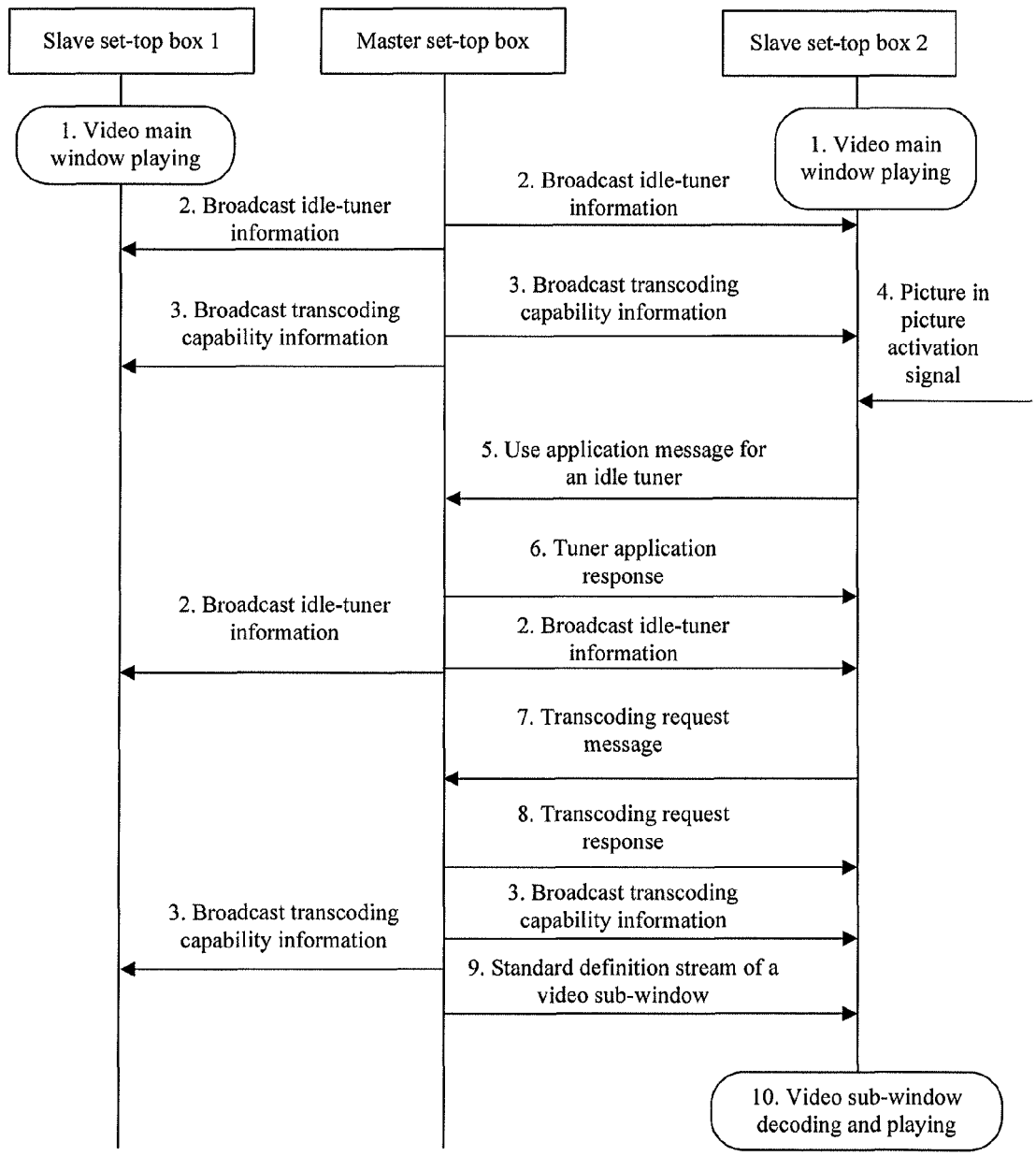
FIG. 3 is a flowchart of a method for implementing picture in picture in a home network according to an embodiment of the present invention.

The method for implementing picture in picture in the home network according to the present invention is further illustrated below in detail through specific embodiments with a digital set-top box as an example. In this embodiment, as shown in FIG. 3, a home network includes a master set-top box (that is, a control device) and two slave set-top boxes, which are slave set-top box 1 and slave set-top box 2, where the master set-top box serves as a control device in the embodiment of the present invention. Optionally, the master set-top box may also implement the same function as the slave set-top box, in addition to serving as a control device. This embodiment includes:

1. Slave set-top box 1 independently obtains, from a video network, a video stream of a channel selected by a first user, and decodes and plays the video stream, so that its video main window plays a channel program selected by the first user; slave set-top box 2 independently obtains, from the video network, a video stream of a channel selected by a second user, and decodes and plays the video stream, so that its video main window plays a channel program selected by the second user.

2. The master set-top box broadcasts idle-tuner information to slave set-top box 1 and slave set-top box 2.

It should be note that, if the idle-tuner information is updated before the broadcast, the master set-top box broadcasts updated idle-tuner information; in addition, in this embodiment, the idle-tuner information is sent periodically at intervals or sent in an event-triggered manner.

3. The master set-top box broadcasts transcoding capability information to slave set-top box 1 and slave set-top box 2.

It should be note that, if the transcoding capability information is updated before the broadcast, the master set-top box broadcasts updated transcoding capability information; in addition, in this embodiment, the transcoding capability information is sent periodically at intervals or sent in an event-triggered manner.

4. Slave set-top box 2 receives a picture in picture activation signal sent by the second user.

5. Slave set-top box 2 determines, according to last received idle-tuner information and transcoding capability information of the master set-top box, whether the master set-top box supports a picture in picture capability, that is, whether the master set-top box has an idle tuner and is capable of video transcoding; if it is determined that the master set-top box supports the picture in picture function, slave set-top box 2 sends a use application message for an idle tuner to the master set-top box.

6. The master set-top box determines, among idle tuners, a tuner currently allocated for this use application of slave set-top box 2 for use, that is, a tuner used for a video sub-window of slave set-top box 2, and then sends a response message to slave set-top box 2, where the response message carries an ID number of the tuner allocated for this use application of slave set-top box 2 for use.

7. Slave set-top box 2 sends a transcoding request message to the master set-top box, where the transcoding request message carries a number of a picture in picture video sub-window channel and the ID number of the tuner used by the master set-top box for the video sub-window of slave set-top box 2.

8. The master set-top box responds to the transcoding request of slave set-top box 2, and sends, to slave set-top box 2, a response message indicating transcoding request success or failure.

9. If the transcoding request succeeds, the master set-top box uses the tuner corresponding to the ID to obtain a high definition video stream of a video sub-window channel of slave set-top box 2 from a cable network, transcodes the high definition video stream into a standard definition video stream, and sends the standard definition video stream to slave set-top box 2.

10. Slave set-top box 2 receives the standard definition video stream transcoded by the master set-top box, and decodes and plays the video stream.

Figure 4:
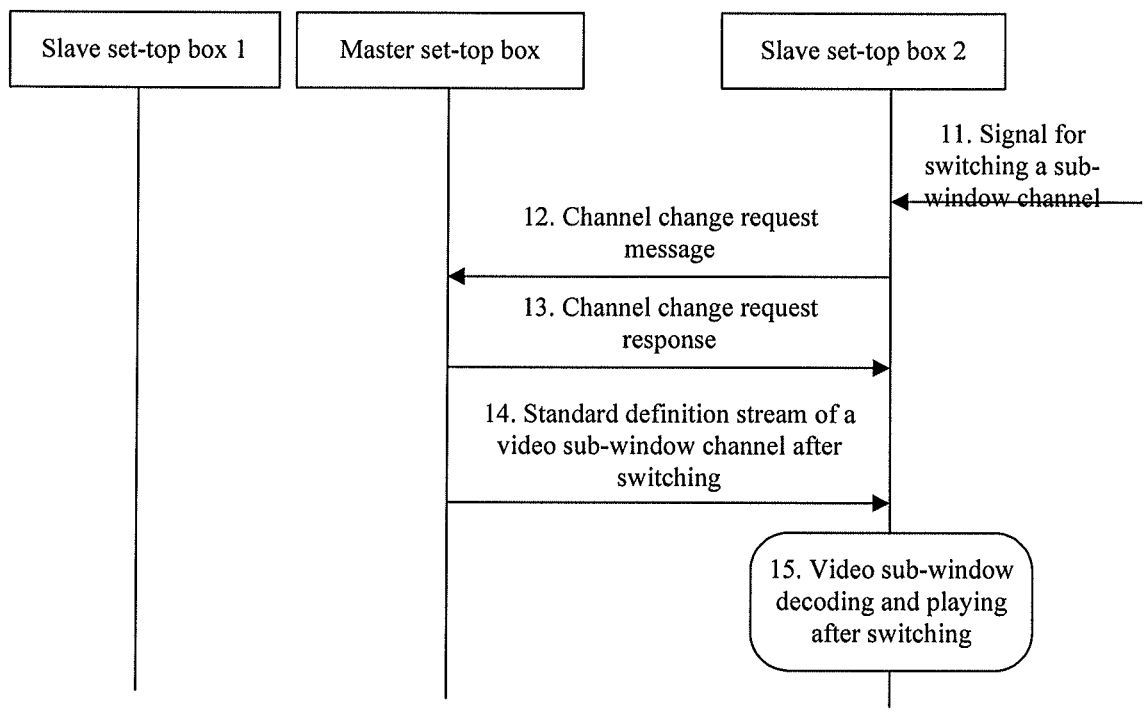
FIG. 4 is a flowchart of a method for implementing picture in picture in a home network according to an embodiment of the present invention.

Further, when the second user switches the channel of the video sub-window of slave set-top box 2, as shown in FIG. 4, this embodiment includes the following:

11. Slave set-top box 2 receives a signal which is sent by the second user and is for switching the video sub-window channel.

12. Slave set-top box 2 sends a channel change request message to the master set-top box, where the channel change request message includes a number of a video sub-window channel selected by the second user and the ID number of the tuner used by the master set-top box for the video sub-window.

13. The master set-top box responds to the transcoded channel change request of slave set-top box 2, and sends, to slave set-top box 2, a response message indicating transcoded channel change request success or failure.

14. If the transcoding request succeeds, the master set-top box uses the tuner of the ID to obtain, from the Cable, a high definition video stream of the video sub-window channel of slave set-top box 2 after switching of the second user, transcodes the high definition video stream into a standard definition video stream; and sends the standard definition video stream to slave set-top box 2.

15. Slave set-top box 2 receives the standard definition video stream of the video sub-window after the switching of the second user, where the video stream has been transcoded by the master set-top box, and decodes and plays the video stream.

Figure 5:
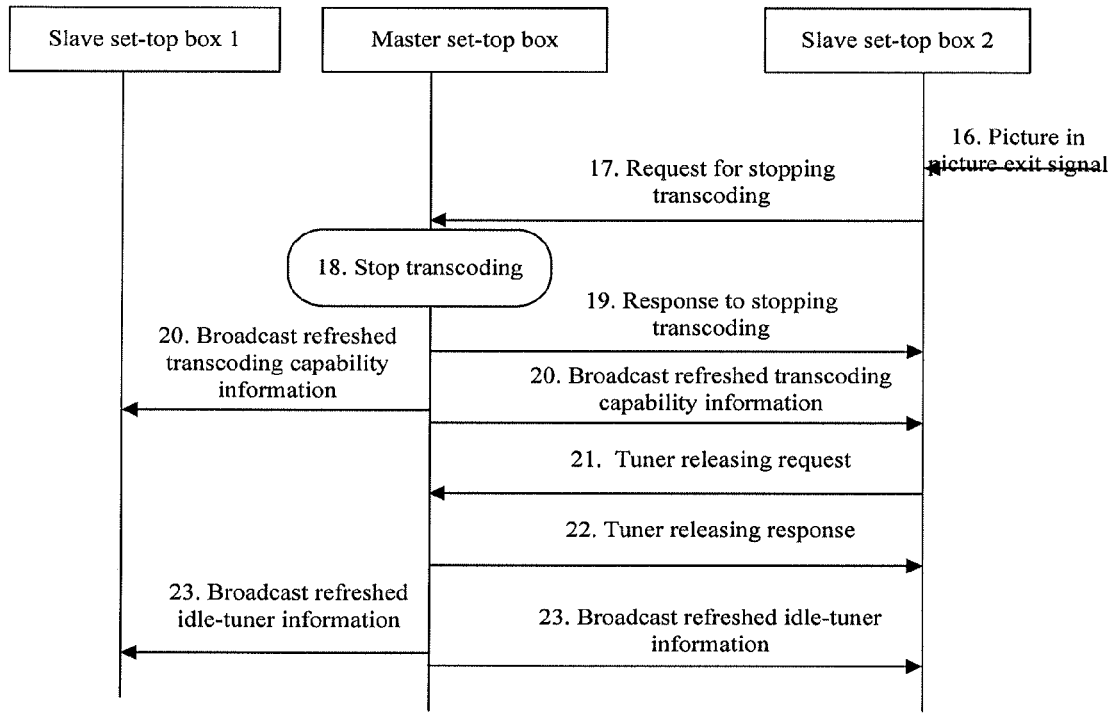
FIG. 5 is a flowchart of a method for implementing picture in picture in a home network according to an embodiment of the present invention.

Further, when the second user exits the picture in picture function, as shown in FIG. 5, this embodiment includes:

16. Slave set-top box 2 receives a picture in picture exit signal sent by the second user.

17. Slave set-top box 2 sends a request for stopping transcoding to the master set-top box, where the request for stopping transcoding includes the ID number of the tuner used by the master set-top box for the video sub-window of the slave set-top box.

18. The master set-top box stops transcoding.

19. The master set-top box responds to the request for stopping transcoding, and sends, to slave set-top box 2, a response message indicating success or failure of stopping transcoding.

20. The master set-top box refreshes the transcoding capability information and broadcasts refreshed transcoding capability information.

21. Slave set-top box 2 sends a tuner releasing request to the master set-top box, where the tuner releasing request includes the ID number of the tuner used by the master set-top box for the video sub-window of the slave set-top box.

22. The master set-top box responds to the tuner releasing request of the slave set-top box, stops using the tuner of the ID, and sends, to slave set-top box 2, a response message indicating tuner release success or failure.

23. The master set-top box refreshes the idle-tuner information, and broadcasts refreshed idle-tuner information.

In the method for implementing picture in picture in the home network provided by this embodiment, when implementing the picture in picture function, the slave set-top box independently obtains the video stream of the video main window from the video network and decodes and plays the video stream of the video main window, while with respect to the video sub-window, the slave set-top box depends on the master set-top box to obtain the video stream of the video sub-window from the Cable and perform transcoding, and then the slave set-top box decodes and plays the video stream transcoded by the master set-top box. Therefore, it is not required that each slave set-top box supporting the picture in picture function in the home network does is configured with two or more tuners for separately obtaining the video stream of the main window and the video stream of the sub-window from the video network, and therefore, the cost is saved effectively.

Figure 6:
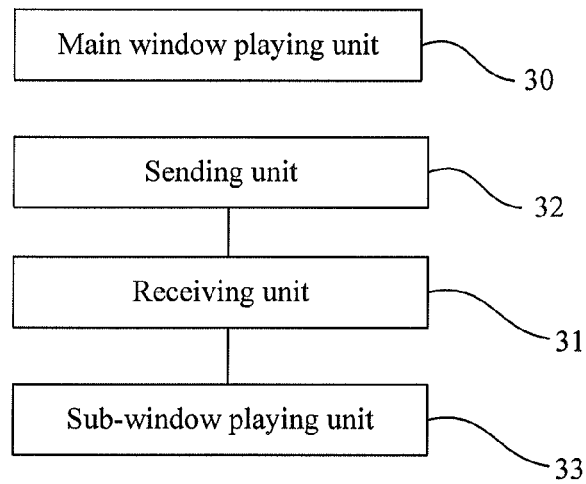
FIG. 6 is a structural block diagram of a video device according to an embodiment of the present invention.

Accordingly, an embodiment of the present invention further provides a video device, as shown in FIG. 6, including:

a main window playing unit 30, configured to independently obtain a video stream of a video main window from a video network and decode and play the video stream of the main window;

a receiving unit 31, configured to receive a picture in picture activation signal sent by a user;

a sending unit 32, configured to send a transcoding request message to a control device, where the transcoding request message carries a number of a picture in picture video sub-window channel; where the receiving unit 31 is further configured to receive a video stream of the video sub-window channel, where the video stream has been transcoded and then sent by the control device; and a sub-window playing unit 32, configured to decode and play the video stream of the video sub-window channel, where the video stream is received by the receiving unit.

The video device provided by the embodiment of the present invention, when implementing a picture in picture function, independently obtains the video stream of the video main window from the video network and decodes and plays the video stream of the video main window, while with respect to a video sub-window, the video device depends on the control device to obtain a video stream of a video sub-window from the video network and perform transcoding, and then the video device decodes and plays the video stream transcoded by the control device. Therefore, it is not required that each video device supporting the picture in picture function configured with two or more tuners for separately obtaining the video stream of the main window and the video stream of the sub-window from the video network, and therefore, the cost is saved effectively.

Preferably, the transcoding request message sent by the sending unit 32 further carries decoding capability information of the video device, so that the control device determines, according to the decoding capability information, a transcoding manner of the video stream of the video sub-window channel.

Further, in an embodiment of the present invention:

the receiving 31 is further configured to receive a signal which is sent by the user and is for switching the video sub-window channel;

the sending unit 32 is further configured to send a transcoded channel change request message to the control device, where the channel change request message includes a number of a video sub-window channel to which the user switches; and the receiving unit 31 is further configured to receive a video stream of the video sub-window channel to which the user switches, where the video stream has been transcoded by the control device, and is sent by the control device.

The sub-window playing unit 33 is further configured to decode and play the video stream of the video sub-window channel to which the user switches, where the video stream is received by the receiving unit 31.

In this way, switching and playing of the video sub-window channel are implemented.

Further, in an embodiment of the present invention:

the receiving unit 31 is further configured to receive a picture in picture exit signal sent by the user; and the sending unit 32 is further configured to send a request for stopping transcoding to the control device.

In this way, an exit from the picture in picture function is implemented.

Figure 7:
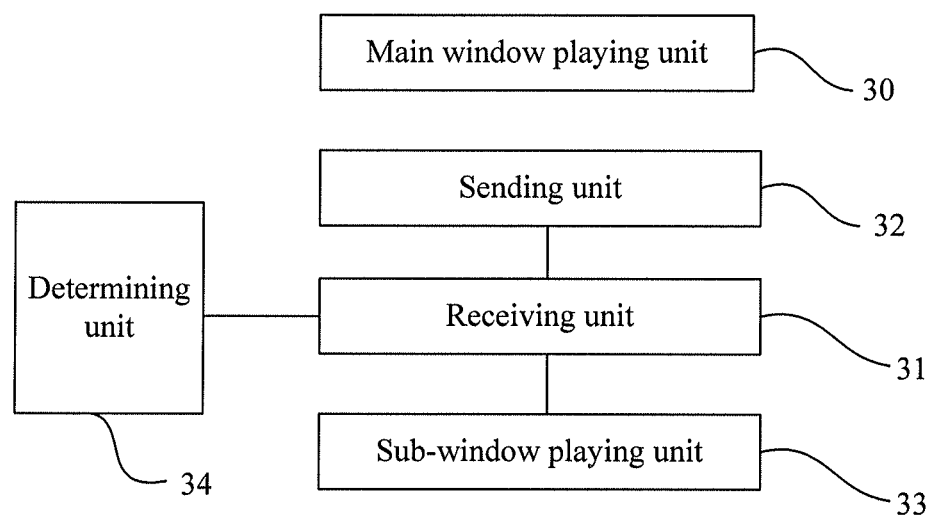
FIG. 7 is a structural block diagram of a video device according to an embodiment of the present invention.

Further, in an embodiment of the present invention, as shown in FIG. 7, a determining unit 34 is further included. In this case, the receiving unit 31 is further configured to: receive idle-tuner information of the control device which is broadcast by the control device; and, receive transcoding capability information of the control device which is broadcast by the control device;

the determining unit 34 is configured to determine, according to the idle-tuner information and transcoding capability information of the control device which are received by the receiving unit, whether the control device has an idle tuner and is capable of video transcoding; and the sending unit 32 is specifically configured to send the transcoding request message to the control device if the determining unit 34 determines that the control device has an idle tuner and is capable of video transcoding.

Further, in an embodiment of the present invention:

the sending unit 32 is further configured to send a use application message for an idle tuner to the control device;

the receiving unit 31 is further configured to receive a response message of the control device for the use application, where the response message includes an identity of a tuner which is allocated by the control device from idle tuners to the video sub-window for use; and in this case, the sending unit 32 is specifically configured to send a transcoding request message to the control device, where the transcoding request message carries the number of the picture in picture video sub-window channel and the identity of the tuner allocated by the control device to the video sub-window for use, so that the control device obtains, by using the tuner corresponding to the identity, the video stream of the video sub-window channel from the video network, and transcodes the video stream.

Further, if the user needs to switch the channel of the video sub-window:

the receiving 31 is further configured to receive a signal which is sent by the user and is for switching the video sub-window channel;

the sending unit 32 is further configured to send a transcoded channel change request message to the control device, where the channel change request message includes a number of a video sub-window channel to which the user switches, and the identity of the tuner allocated by the control device to the video sub-window for use;

the receiving unit 31 is further configured to receive a video stream of the video sub-window channel to which the user switches, where the video stream is obtained from the video network and through the tuner corresponding to the identity, and has been transcoded by the control device, and sent by the control device; and the sub-window playing unit 33 is further configured to:

decode and play the video stream of the video sub-window to which the user switches, where the video stream is received by the receiving unit 31.

Further, if the user needs to exit the picture in picture function:

the receiving unit 31 is further configured to receive a picture in picture exit signal sent by the user;

the sending unit 32 is further configured to send a request for stopping transcoding to the control device, where the request for stopping transcoding includes the identity of the tuner allocated by the control device to the video sub-window for use, so that the control device stops transcoding a video stream obtained from the video network and through the tuner corresponding to the identity, and refreshes the transcoding capability information of the control device; and the sending unit 32 is further configured to send a tuner releasing request to the control device, where the tuner releasing request includes the identity of the tuner allocated by the control device to the video sub-window for use, so that the control device stops using the tuner corresponding to the identity, and refreshes the idle-tuner information of the control device.

Figure 8:
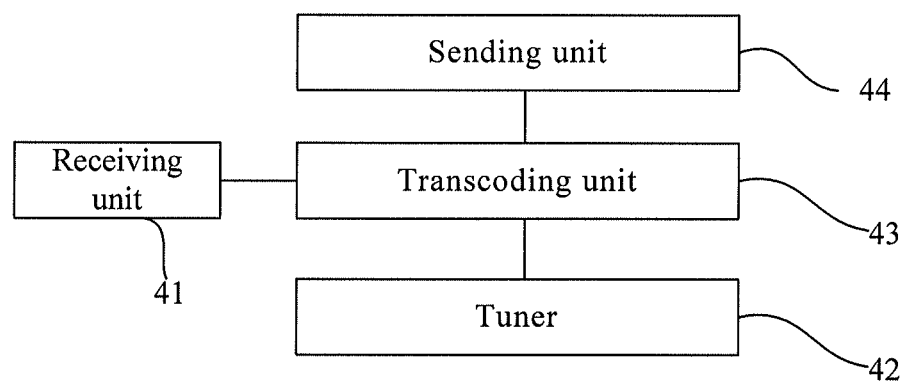
FIG. 8 is a structural block diagram of a control device according to an embodiment of the present invention.

Accordingly, an embodiment of the present invention further provides a control device, as shown in FIG. 8, including:

a receiving unit 41, configured to receive a transcoding request message sent by a video device, where the transcoding request message carries a number of a picture in picture video sub-window channel;

at least one tuner 42, configured to obtain a video stream from a video network;

a transcoding unit 43, configured to transcode a video stream of video sub-window channel, where the video stream is obtained by the tuner from the video network; and a sending unit 44, configured to send a transcoded video stream of the video sub-window channel to the video device.

By using the control device provided by the embodiment of the present invention, when implementing the picture in picture function, with respect to a video sub-window, the video device can depend on the control device to obtain the video stream of the video sub-window from the video network and perform transcoding, and then the video device decodes and plays the video stream transcoded by the control device. Therefore, it is not required that each video device supporting the picture in picture function is configured with two or more tuners for separately obtaining the video stream of the main window and the video stream of the sub-window from the video network, and therefore, the cost is saved effectively.

Figure 9:
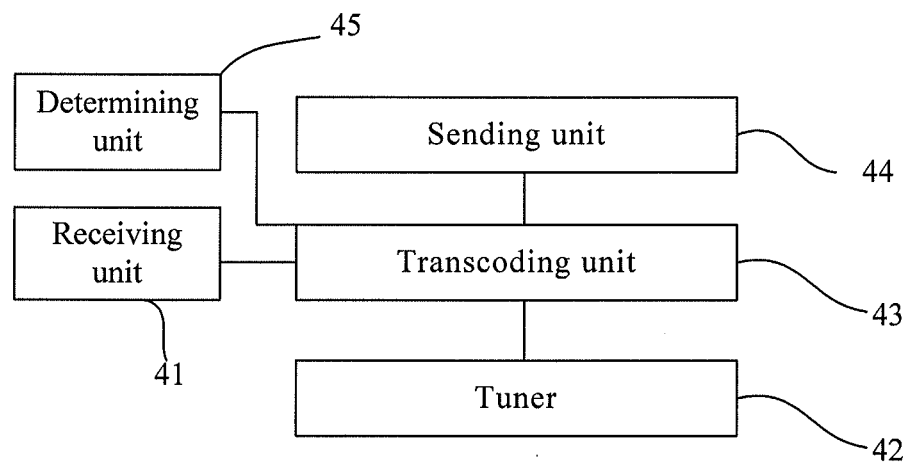
FIG. 9 is a structural block diagram of a control device according to an embodiment of the present invention.

Preferably, the transcoding request message received by the receiving unit 41 further carries decoding capability information of the video device;

in this case, as shown in FIG. 9, the control device further includes:

a determining unit 45, configured to determine, according to the decoding capability information, a transcoding manner of the video stream of the video sub-window channel; and in this case, the transcoding unit 43 is specifically configured to transcode, in the transcoding manner determined by the determining unit 45, the video stream of the video sub-window channel, where the video stream is obtained by the tuner from the video network.

Further, in an embodiment of the present invention:

the receiving unit 41 is further configured to: receive a transcoded channel change request message sent by the video device, where the transcoded channel change request message includes a number of a video sub-window channel to which a user switches;

the transcoding unit 43 is specifically configured to transcode a video stream of the video sub-window channel to which the user switches, where the video stream is obtained from the video network by a tuner 42 corresponding to an identity; and the sending unit 44 is specifically configured to send, to the video device, a transcoded video stream of the video sub-window channel to which the user switches.

In this way, switching and playing of the video sub-window channel are implemented.

Figure 10:
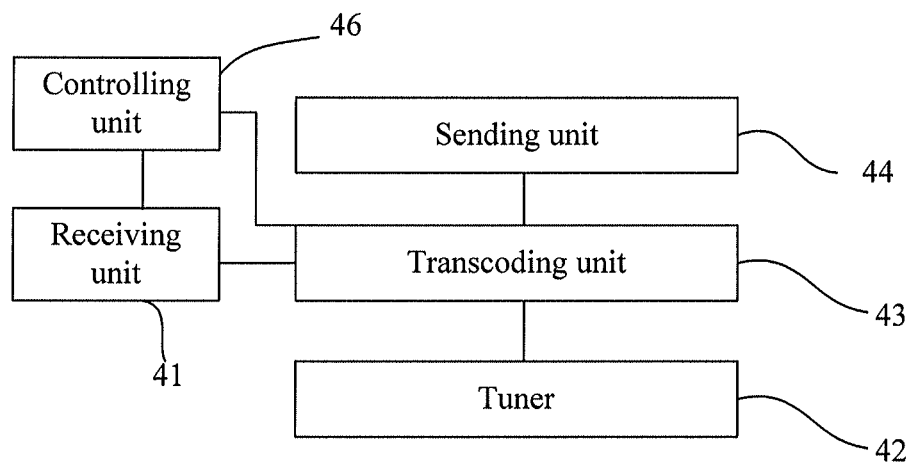
FIG. 10 is a structural block diagram of a control device according to an embodiment of the present invention.

Further, as shown in FIG. 10, in an embodiment of the present invention:

the receiving unit 41 is further configured to receive a request for stopping transcoding sent by the video device; and the control device further includes a controlling unit 46 configured to, according to the request for stopping transcoding, control the transcoding unit to stop transcoding the video stream of the video sub-window channel, where the video stream is obtained from the video network.

In this way, an exit from the picture in picture function is implemented.

Further, in an embodiment of the present invention:

the sending unit 44 is further configured to:

broadcast idle-tuner information to the video device in the home network; and broadcast transcoding capability information to the video device in the home network.

Further, as shown in FIG. 9, in an embodiment of the present invention:

the receiving unit 41 is further configured to receive a use application message for an idle tuner sent by the video device;

the control device further includes a determining unit 45, configured to determine, among idle tuners, a tuner allocated to the video sub-window for use;

the sending unit 44 is further configured to send a response message for the use application to the video device, where the response message includes an identity of the determined tuner allocated to the video sub-window for use;

the receiving unit 41 is specifically configured to receive a transcoding request message sent by the video device, where the transcoding request message carries the number of the picture in picture video sub-window channel and the identity of the determined tuner allocated to the video sub-window for use; and the transcoding unit 43 is specifically configured to transcode the video stream of the video sub-window channel, where the video stream is obtained from the video network by a tuner 42 corresponding to the identity.

Further, if the user needs to switch the channel of the video sub-window:

the receiving unit 41 is further configured to:

receive a transcoded channel change request message sent by the video device, where the channel change request message includes a number of a video sub-window channel to which the user switches, and the identity of the tuner allocated by the control device to the video sub-window for use;

the transcoding unit 43 is further configured to:

obtain, from the video network and through the tuner corresponding to the identity, a video stream of the video sub-window channel to which the user switches, and transcode the video stream; and the sending unit 44 is further configured to:

send, to the video device, a transcoded video stream of the video sub-window channel to which the user switches.

Further, if the user needs to exit the picture in picture function:

the receiving unit 41 is further configured to:

receive a request for stopping transcoding sent by the video device, where the request for stopping transcoding includes the identity of the tuner allocated by the control device to the video sub-window for use; and receive a tuner releasing request sent by the video device, where the tuner releasing request includes the identity of the tuner allocated by the control device to the video sub-window for use; and the controlling unit 46 is specifically configured to:

according to the request for stopping transcoding, control the transcoding unit to stop transcoding the video stream obtained from the video network and through the tuner corresponding to the identity, and refresh the transcoding capability information; and according to the tuner releasing request, perform control to stop using the tuner corresponding to the identity, and refresh the idle-tuner information.

Figure 11:
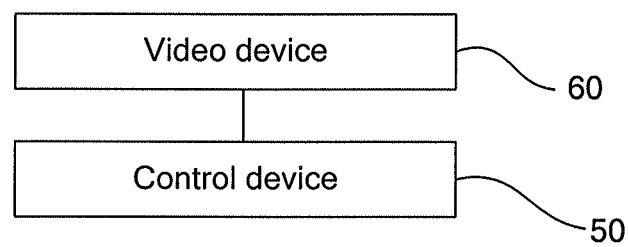
FIG. 11 is a structural block diagram of a video system according to an embodiment of the present invention.

Accordingly, an embodiment of the present invention further provides a video system in a home network, as shown in FIG. 11, including:

a control device 50 and at least two video devices 60, where, the control device 50 includes at least one tuner and supports video transcoding, and a video device 60 supports video decoding on at least two channels;

the video device 60 is configured to:

independently obtain a video stream of a picture in picture main window from a video network, and decode and play the video stream of the main window;

receive a picture in picture activation signal sent by a user;

send a transcoding request message to the control device 50, where the transcoding request message carries a number of a picture in picture video sub-window channel;

receive a video stream of the video sub-window channel, where the video stream has been transcoded and then sent by the control device 50; and decode and play the received video stream of the video sub-window channel; and the control device 50 is configured to:

receive the transcoding request message sent by the video device 60, where the transcoding request message carries the number of the picture in picture video sub-window channel;

by using the tuner, obtain a video stream of the video sub-window channel from the video network, and transcode the video stream; and send the transcoded video stream of the video sub-window channel to the video device 60.

In the video system provided by the embodiment of the present invention, when implementing a picture in picture function, a video device 60 independently obtains the video stream of the video main window from the video network and decodes and plays the video stream of the video main window, while with respect to the video sub-window, the video device 60 depends on the control device 50 to obtain the video stream of the video sub-window from the video network and perform transcoding, and then the video device 60 decodes and plays the video stream transcoded by the control device 50. Therefore, it is not required that each video device supporting the picture in picture function configured with two or more tuners for separately obtaining the video stream of the main window and the video stream of the sub-window from the video network, and therefore, the cost is saved effectively.

The video device 60 may be a video device provided by the embodiments of the present invention, and the control device 50 may be a control device provided by the embodiments of the present invention, which are not described in detail herein.

Persons of ordinary skill in the art can understand that all or part of the procedures in the foregoing method embodiments may be completed by a computer program instructing relevant hardware. The program may be stored in a computer readable storage medium. When the program runs, the steps in the foregoing method embodiments are executed. The storage medium includes various media that can store program codes, such as a ROM, a RAM, a magnetic disk, or an optical disk.

The foregoing descriptions are merely specific implementation manners of the present invention, but not intended to limit the protection scope of the present invention. Any variation or replacement can be easily figured out by persons skilled in the art within the technical scope of the present invention shall fall within the protection scope of the present invention. Therefore, the protection scope of the present invention is subject to the protection scope of the claims.

What is claimed is:

1. A method for implementing picture in picture in a home network, comprising:

obtaining a video stream of a video main window from a video network and decoding and playing the video stream of the main window;

receiving a picture in picture activation signal sent by a user;

sending a transcoding request message to a control device, wherein the transcoding request message carries a number of a picture in picture video sub-window channel;

receiving a video stream of the video sub-window channel, wherein the video stream has been transcoded and then sent by the control device; and decoding and playing the video stream of the video sub-window channel.

2. The method according to claim 1, wherein the transcoding request message further carries decoding capability information of a video device itself, so that the control device determines a transcoding manner of the video stream of the video sub-window channel according to the decoding capability information.

3. The method according to claim 1, wherein, the method further comprises:

receiving idle-tuner information of the control device which is broadcast by the control device;

receiving transcoding capability information of the control device which is broadcast by the control device; and according to the received idle-tuner information and transcoding capability information of the control device, determining whether the control device has an idle tuner and is capable of video transcoding;

the sending the transcoding request message to the control device comprises:

if it is determined that the control device has an idle tuner and is capable of video transcoding, sending the transcoding request message to the control device.

4. The method according to claim 1, wherein after receiving the picture in picture activation signal sent by the user and before sending the transcoding request message to the control device, the method further comprises:

sending a use application message for an idle tuner to the control device; and receiving a response message of the control device for the use application, wherein the response message comprises an identity of a tuner which is allocated by the control device from idle tuners to a video sub-window for use; and the sending the transcoding request message to the control device, wherein the transcoding request message carries the number of the video sub-window channel, comprises:

sending a transcoding request message to the control device, wherein the transcoding request message carries the number of the video sub-window channel and the identity of the tuner allocated by the control device to the video sub-window for use, so that the control device obtains, through the tuner corresponding to the identity, the video stream of the video sub-window channel from the video network, and transcodes the video stream.

5. The method according to claim 4, wherein after decoding and playing the received video stream of the video sub-window channel, the method further comprises:
- receiving a signal which is sent by the user and is for switching the video sub-window channel;
- sending a transcoded channel change request message to the control device, wherein the channel change request message comprises a number of a video sub-window channel to which the user switches, and the identity of the tuner allocated by the control device to the video sub-window for use;
- receiving a video stream of the video sub-window channel to which the user switches, wherein the video stream is obtained from the video network and by using the tuner corresponding to the identity, and has been transcoded by the control device, and is sent by the control device; and
- decoding and playing the received video stream of the video sub-window channel to which the user switches;

or wherein after decoding and playing the received video stream of the video sub-window channel, the method further comprises:
- receiving a picture in picture exit signal sent by the user;
- sending a request for stopping transcoding to the control device, wherein the request for stopping transcoding comprises the identity of the tuner allocated by the control device to the video sub-window for use, so that the control device stops transcoding a video stream obtained from the video network and by using the tuner corresponding to the identity, and refreshes transcoding capability information of the control device; and
- sending a tuner releasing request to the control device, wherein the tuner releasing request comprises the identity of the tuner allocated by the control device to the video sub-window for use, so that the control device stops using the tuner corresponding to the identity, and refreshes idle-tuner information of the control device.

6. A method for implementing picture in picture in a home network, comprising:
- receiving a transcoding request message sent by a video device, wherein the transcoding request message carries a number of a picture in picture video sub-window channel;
- obtaining a video stream of the video sub-window channel from a video network and transcoding the video stream; and
- sending a transcoded video stream of the video sub-window channel to the video device.

7. The method according to claim 6, wherein,
the transcoding request message further carries decoding capability information of the video device;
the method further comprises:
according to the decoding capability information, determining a transcoding manner of the video stream of the video sub-window channel; and
the transcoding the video stream comprises:
transcoding the video stream in the determined transcoding manner.

8. The method according to claim 6, further comprising:
- broadcasting idle-tuner information to the video device in a home network; and
- broadcasting transcoding capability information to the video device in the home network.

9. The method according to claim 6, wherein before receiving the transcoding request message sent by the video device, the method further comprises:
- receiving a use application message for an idle tuner sent by the video device;
- among idle tuners, determining a tuner allocated to a video sub-window for use; and
- sending a response message for the use application to the video device, wherein the response message comprises an identity of the determined tuner allocated to the video sub-window for use;
- the receiving the transcoding request message sent by the video device, wherein the transcoding request message carries the number of the picture in picture video sub-window channel, comprises:
- receiving a transcoding request message sent by the video device, wherein the transcoding request message carries the number of the picture in picture video sub-window channel and the identity of the determined tuner allocated to the video sub-window for use;
- the obtaining the video stream of the video sub-window channel from the video network and transcoding the video stream comprises:
- by using the tuner corresponding to the identity, obtaining the video stream of the video sub-window channel from the video network, and transcoding the video stream.

10. The method according to claim 9, wherein after sending the transcoded video stream of the video sub-window channel to the video device, the method further comprises:
- receiving a transcoded channel change request message sent by the video device, wherein the channel change request message comprises a number of a video sub-window channel to which a user switches, and the identity of the tuner allocated by a control device to the video sub-window for use;
- through the tuner corresponding to the identity, obtaining, from the video network, a video stream of the video sub-window channel to which the user switches, and transcoding the video stream; and
- sending, to the video device, a transcoded video stream of the video sub-window channel to which the user switches;

or wherein after sending the transcoded video stream of the video sub-window channel to the video device, the method further comprises:
- receiving a request for stopping transcoding sent by the video device, wherein the request for stopping transcoding comprises the identity of the tuner allocated by a control device to the video sub-window for use;
- according to the request for stopping transcoding, stopping transcoding the video stream obtained from the video network and through the tuner corresponding to the identity, and refreshing transcoding capability information;
- receiving a tuner releasing request sent by the video device, wherein the tuner releasing request comprises the identity of the tuner allocated by the control device to the video sub-window for use; and
- according to the tuner releasing request, stopping using the tuner corresponding to the identity, and refreshing idle-tuner information.

11. A video device, comprising:
- a main window playing unit, configured to obtain a video stream of a video main window from a video network and decode and play the video stream of the main window;
- a receiving unit, configured to receive a picture in picture activation signal sent by a user;

a sending unit, configured to send a transcoding request message to a control device, wherein the transcoding request message carries a number of a picture in picture video sub-window channel;

wherein the receiving unit is further configured to receive a video stream of the video sub-window channel, wherein the video stream has been transcoded and then sent by the control device; and a sub-window playing unit, configured to decode and play the video stream of the video sub-window channel, wherein the video stream is received by the receiving unit.

12. The video device according to claim 11, wherein the transcoding request message sent by the sending unit further carries decoding capability information of the video device, so that the control device determines a transcoding manner of the video stream of the video sub-window channel according to the decoding capability information.

13. The video device according to claim 11, wherein,
the receiving unit is further configured to:
receive idle-tuner information of the control device which is broadcast by the control device; and
receive transcoding capability information of the control device which is broadcast by the control device;
the video device further comprises a determining unit, configured to determine, according to the idle-tuner information and transcoding capability information of the control device which are received by the receiving unit, whether the control device has an idle tuner and is capable of video transcoding; and
the sending unit is specifically configured to send the transcoding request message to the control device if the determining unit determines that the control device has an idle tuner and is capable of video transcoding.

14. The video device according to claim 11, wherein,
the sending unit is further configured to send a use application message for an idle tuner to the control device;
the receiving unit is further configured to receive a response message of the control device for the use application, wherein the response message comprises an identity of a tuner allocated by the control device from idle tuners to a video sub-window for use; and
the sending unit is specifically configured to send a transcoding request message to the control device, wherein the transcoding request message carries the number of the picture in picture video sub-window channel and the identity of the tuner allocated by the control device to the video sub-window for use, so that the control device obtains, by using the tuner corresponding to the identity, the video stream of the video sub-window channel from the video network, and transcodes the video stream.

15. The video device according to claim 14, wherein,
the receiving unit is further configured to:
receive a signal which is sent by the user and is for switching the video sub-window channel;
the sending unit is further configured to:
send a transcoded channel change request message to the control device, wherein the channel change request message comprises a number of a video sub-window channel to which the user switches, and the identity of the tuner allocated by the control device to the video sub-window for use;
the receiving unit is further configured to:
receive a video stream of the video sub-window channel to which the user switches, wherein the video stream is obtained from the video network and through the tuner corresponding to the identity, and has been transcoded by the control device, and sent by the control device; and the sub-window playing unit is further configured to:
decode and play the video stream of the video sub-window channel to which the user switches, wherein the video stream is received by the receiving unit;

or wherein,
the receiving unit is further configured to receive a picture in picture exit signal sent by the user;
the sending unit is further configured to send a request for stopping transcoding to the control device, wherein the request for stopping transcoding comprises the identity of the tuner allocated by the control device to the video sub-window for use, so that the control device stops transcoding a video stream obtained from the video network and through the tuner corresponding to the identity, and refreshes transcoding capability information of the control device; and
the sending unit is further configured to send a tuner releasing request to the control device, wherein the tuner releasing request comprises the identity of the tuner allocated by the control device to the video sub-window for use, so that the control device stops using the tuner corresponding to the identity, and refreshes idle-tuner information of the control device.

16. A control device, comprising:
a receiving unit, configured to receive a transcoding request message sent by a video device, wherein the transcoding request message carries a number of a picture in picture video sub-window channel;
at least one tuner, configured to obtain a video stream from a video network;
a transcoding unit, configured to transcode a video stream of the video sub-window channel, wherein the video stream is obtained by the tuner from the video network; and
a sending unit, configured to send a transcoded video stream of the video sub-window channel to the video device.

17. The control device according to claim 16, wherein,
the transcoding request message received by the receiving unit further carries decoding capability information of the video device;
the control device further comprises:
a determining unit, configured to determine, according to the decoding capability information, a transcoding manner of the video stream of the video sub-window channel; and
the transcoding unit is specifically configured to transcode the video stream of the video sub-window channel in the determined transcoding manner, wherein the video stream is obtained by the tuner from the video network.

18. The control device according to claim 16, wherein the sending unit is further configured to:
broadcast idle-tuner information to the video device in a home network; and
broadcast transcoding capability information to the video device in the home network.

19. The control device according to claim 16, wherein,
the receiving unit is further configured to receive a use application message for an idle tuner sent by the video device;
the control device further comprises a determining unit, configured to determine, among idle tuners, a tuner allocated to a video sub-window for use;

the sending unit is further configured to send a response message for the use application to the video device, wherein the response message comprises an identity of the determined tuner allocated to the video sub-window for use;

the receiving unit is specifically configured to receive a transcoding request message sent by the video device, wherein the transcoding request message carries the number of the picture in picture video sub-window channel and the identity of the determined tuner allocated to the video sub-window for use; and the transcoding unit is specifically configured to transcode the video stream of the video sub-window channel, wherein the video stream is obtained from the video network by the tuner corresponding to the identity.

20. The control device according to claim 19, wherein, the receiving unit is further configured to:

receive a transcoded channel change request message sent by the video device, wherein the channel change request message comprises a number of a video sub-window channel to which a user switches, and the identity of the tuner allocated by the control device to the video sub-window for use;

the transcoding unit is further configured to:

obtain, from the video network and through the tuner corresponding to the identity, a video stream of the video sub-window channel to which the user switches, and transcode the video stream; and the sending unit is further configured to:

send, to the video device, a transcoded video stream of the video sub-window channel to which the user switches;

or wherein, the receiving unit is further configured to:

receive a request for stopping transcoding sent by the video device, wherein the request for stopping transcoding comprises the identity of the tuner allocated by the control device to the video sub-window for use; and receive a tuner releasing request sent by the video device, wherein the tuner releasing request comprises the identity of the tuner allocated by the control device to the video sub-window for use; and the control device further comprises a controlling unit, configured to:

according to the request for stopping transcoding, control the transcoding unit to stop transcoding a video stream obtained from the video network and through the tuner corresponding to the identity, and refresh transcoding capability information; and according to the tuner releasing request, perform control to stop using the tuner corresponding to the identity, and refresh idle-tuner information.

* * * * *